United States Patent [19]
Drozt et al.

[11] Patent Number: 5,778,320
[45] Date of Patent: Jul. 7, 1998

[54] METHOD FOR ALLOCATING COMMUNICATION RESOURCES AMONG GROUPS OF COMMUNICATION UNITS

[75] Inventors: Peter M. Drozt, Bartlett; Paul M. Erickson, Palatine; Glenn K. Lubin, Schaumburg, all of Ill.

[73] Assignee: Motorola, Inc., Schaumburg, Ill.

[21] Appl. No.: 725,866

[22] Filed: Oct. 4, 1996

[51] Int. Cl.$^6$ ........................................ H04B 1/06
[52] U.S. Cl. ...................... 455/509; 455/450; 455/514; 455/518
[58] Field of Search ............... 420/450; 455/450, 455/451, 452, 453, 518, 519, 509, 514

[56] References Cited

U.S. PATENT DOCUMENTS

| | | |
|---|---|---|
| 4,348,554 | 9/1982 | Asmuth .................. 179/18 |
| 4,573,207 | 2/1986 | Smith et al. .............. 455/509 |
| 5,363,427 | 11/1994 | Ekstrom et al. .......... 455/450 |
| 5,421,011 | 5/1995 | Camillone et al. ....... 395/650 |
| 5,457,735 | 10/1995 | Erickson ................. 455/450 |
| 5,512,884 | 4/1996 | Hesse et al. ............. 455/509 |

*Primary Examiner*—Nguyen Vo
*Assistant Examiner*—Makoto Aoki
*Attorney, Agent, or Firm*—Daniel C. Crilly

[57] ABSTRACT

A resource allocation device (101, 104) utilizes a method for allocating communication resources (124–129) among groups of communication units (106–109, 111–113, 115). The resource allocation device receives a call request from a communication unit of a first group of communication units. Responsive to the call request, the resource allocation device allocates an available communication resource to communication unit based at least on a quantity of communication resources currently being utilized by the first group of communication units.

19 Claims, 3 Drawing Sheets

METHOD FOR ALLOCATING COMMUNICATION RESOURCES AMONG GROUPS OF COMMUNICATION UNITS

FIELD OF THE INVENTION

The present invention relates generally to communication systems and, in particular, to allocating communication resources among groups of communication units in a communication system.

BACKGROUND OF THE INVENTION

Communication systems in which communication resources, such as voice traffic channels, are shared are well-known as trunked communication systems. Such systems are used extensively in the radio, radiotelephone, and telephone arenas. Each trunked system consists of several service coverage areas and a predetermined number of communication resources. The communication resources are divided into sets and one set is assigned to each coverage area for shared use by all system subscribers located in the particular coverage area. In a typical trunked radio system, the system subscribers are arranged into groups, wherein each group includes one or more system subscribers. For example, one group might be a large fleet of taxis and multiple dispatchers employed by a regional taxi company, while another group might be two delivery trucks and a single dispatcher employed by a local florist.

During operation of a trunked radio system, system subscribers located in particular service coverage areas are allocated available communication resources by a system controller and base sites serving the service coverage areas. When a subscriber desires to communicate, the subscriber transmits a call request to the base site serving the coverage area containing the subscriber. The base site forwards the request to the system controller, which determines whether a resource is available at the base site to support the requested call. When such a resource is available, the system controller and the base site allocate the resource to the requesting subscriber.

In theory, each subscriber in a particular service coverage area has an equal opportunity to obtain access to one of the set of communication resources allocated to the particular service coverage area. However, during periods of heavy communication traffic, smaller groups have a lower probability of gaining system access because larger groups, with many more subscribers than the smaller groups, can consume all the communication resources in a particular service coverage area and throughout the system. Therefore, although each individual subscriber has an equal opportunity to access the communication system, each group of subscribers does not. Consequently, smaller groups may be prevented from accessing the system for substantial periods of time due to heavy use of the system by larger groups.

Therefore, a need exists for a method of allocating system resources among system subscribers that prevents larger groups from monopolizing communication resources to the detriment of smaller groups.

DESCRIPTION OF A PREFERRED EMBODIMENT

Generally, the present invention provides a method for allocating communication resources among groups of communication units. A resource allocation device, such as a system controller or a base site, receives a call request from a communication unit of a first group of communication units. Responsive to the call request, the resource allocation device allocates an available communication resource to the communication unit based at least on a quantity of communication resources currently being utilized by the first group of communication units. By allocating communication resources in this manner, the present invention substantially prevents larger groups of communication units from monopolizing system resources to the detriment of smaller groups of communication units, especially during busy hours of the day, by putting a cap on the number of resources any one group may consume at any particular time.

Figure 1:
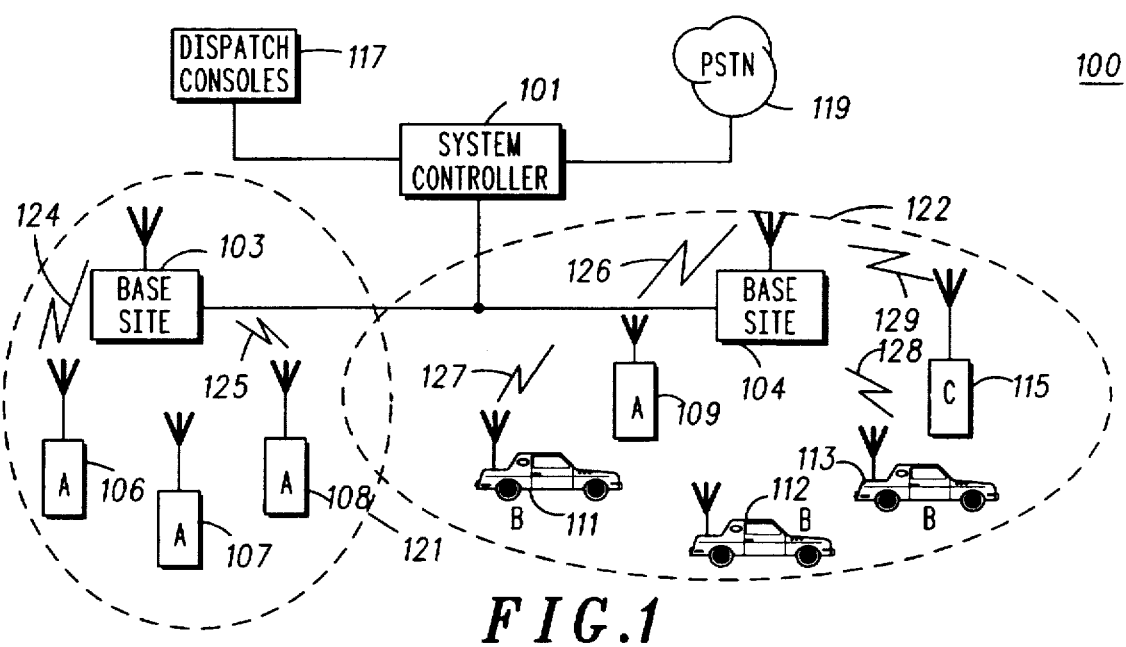
FIG. 1 illustrates a block diagram of an exemplary radio communication system that may beneficially employ the present invention.
Figure 2:
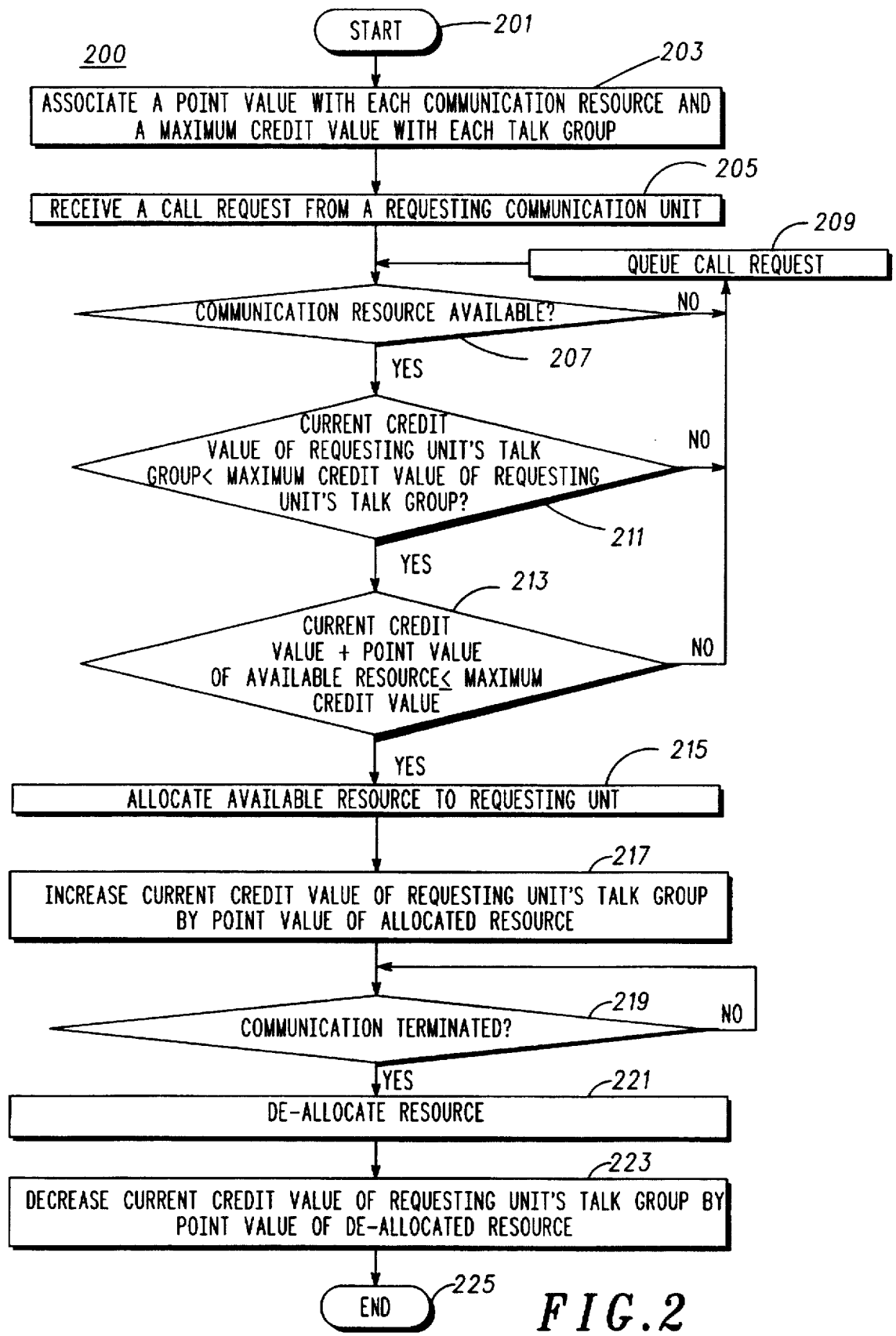
FIG. 2 illustrates a logic flow diagram of steps executed by a system controller to allocate communication resources in accordance with a preferred embodiment of the present invention.
Figure 3:
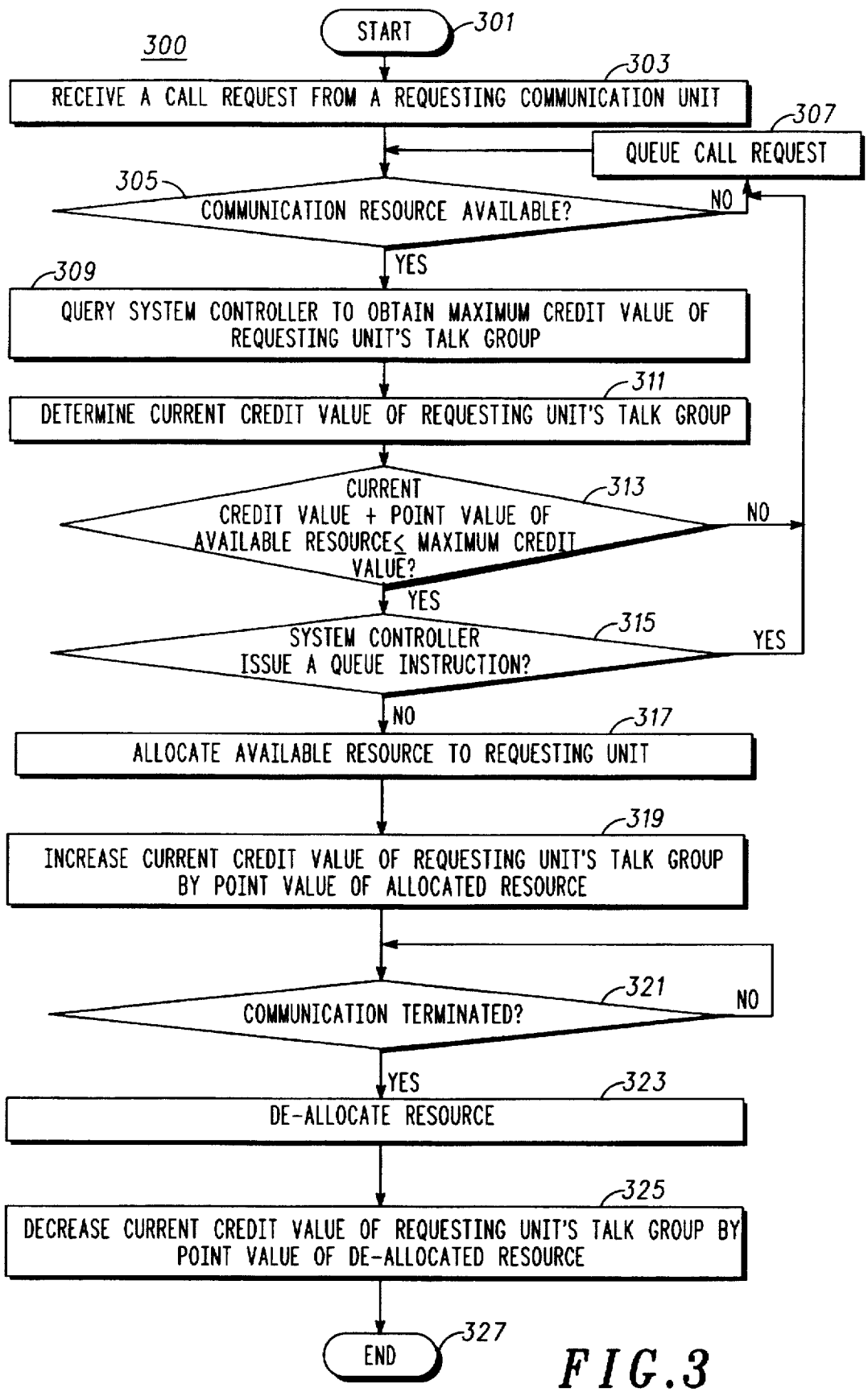
FIG. 3 illustrates a logic flow diagram of steps executed by a base site to allocate communication resources in accordance with an alternative embodiment of the present invention.

The present invention can be more fully understood with reference to FIGS. 1–3. FIG. 1 illustrates a block diagram of an exemplary radio communication system 100 that may beneficially employ the present invention. The radio communication system 100 preferably includes a system controller 101, a plurality of base sites 103–104 (two shown), a plurality of communication units 106–109, 111–113, 115, and one or more dispatch consoles 117. The system controller 101 preferably comprises an "iDEN" Dispatch Application Processor that is commercially available from Motorola, Inc. of Schaumburg, Ill. The system controller 101 manages calls in the communication system 100 and preferably includes a switch that couples the base sites 103–104 to the dispatch consoles 117 and the public switched telephone network 119.

The base sites 103–104 preferably comprise "MOTOROLA" "iDEN" Enhanced Base Transceiver Sites. Each base site 103–104 provides communication service to communication units located in the base sites' respective service coverage areas 121, 122. For example, as shown in FIG. 1, base site 103 provides communication service to communication units 106–108 and base site 104 provides communication service to communication units 109, 111–113, and 115. The communication units 106–109, 111–113, 115 are arranged into a plurality of groups and preferably comprise mobile or portable radios or radiotelephones. As shown in FIG. 1, communication units 106–109 comprise portable radio devices and constitute group A, communication units 111–113 comprise mobile radio devices and constitute group B, and communication unit 115 comprises a portable radio device and constitutes group C.

The radio communication system 100 operates substantially as follows in accordance with the present invention. Each base site 103–104 is assigned a particular number of communication resources 124–129 either during initial system configuration or dynamically during system operation. In addition, each communication resource 124–129, which may be a pair of radio frequency channels, a pair of time slots, or a pair of orthogonal codes, is associated with a particular point value. For example, a communication resource that can support telephone interconnect may be associated with a point value of two; whereas, a communication resource that supports a dispatch call may be associated with a point value of one. Each resource allocation device (i.e., system controller 101 and base sites 103–104) may associate its own particular point values with each of its respective communication resources. For example, each base sites 103–104 might associate a point value of one with each of its assigned resources; whereas, the system controller 101 might associate varying point values with each resource in the system depending on the communication services (e.g., telephone interconnect, dispatch group call, dispatch private call, etc.) supported by the particular resource. In the preferred embodiment, both the base sites 103–104 and the system controller 101 associate a point value of one with each of their respective communication resources, regardless of the service supported by the particular resource.

In addition to associating point values with communication resources, each resource allocation device also associates a maximum credit value with each group of communication units. The maximum credit value is the cumulative point value associated with a maximum number of communication resources that any particular group may utilize at any one particular time. Accordingly, the maximum credit value of a group at the system controller 101 is the maximum number of communication resource points that the group may utilize at any one time throughout the communication system 100. Similarly, the maximum credit value of a group at a base site is the maximum number of communication resource points that the group may utilize at any one time at that base site. For the purposes of this discussion, it is assumed that group A has a maximum credit value of three at the system controller and three at each base site 103–104, group B has a maximum credit value of three at the system controller and two at each base site 103–104, and group C has a maximum credit value of one at the system controller and one at each base site 103–104. The group maximum credit values for both the system controller 101 and the base sites 103–104 are preferably stored in memory, such as random access memory or programmable read only memory, at the system controller 101. In an alternative embodiment, the group maximum credit values might be stored at the system controller 101 and base sites, respectively. The respective communication resource point associations are preferably stored in memory devices at the system controller 101 and the base sites 103–104.

It is further assumed for the purposes of this discussion that communication units 106 and 108 of group A are currently utilizing two communication resources 124, 125 at base site 103, communication unit 109 of group A is currently utilizing one communication resource 126 at base site 104, communication units 111 and 113 of group B are currently utilizing two communication resources 127, 128 at base site 104, and communication unit 115 of group C is currently utilizing one communication resource 129 at base site 104.

Upon determining a need to communicate, communication unit 107 of group A transmits a call request to base site 103. Upon receiving the call request, the base site 103 determines whether or not any communication resources are available (unused) to support the requested call and forwards the call request to the system controller 101. When a communication resource is available, the base site 103 either accesses its memory to determine the maximum base site credit value for group A or, if the base site 103 does not already have the maximum base site credit value for group A, queries the system controller 101 to obtain group A's maximum base site credit value. As mentioned above, the maximum base site credit value for group A is three.

Upon obtaining the maximum base site credit value, the base site 103 determines whether a current base site credit value for group A plus a point value associated with a communication resource that is available to support the particular call request is less than or equal to the maximum base site credit value for group A. The current credit value for a particular group is the summation of points associated with communication resources currently being used by communication units in the particular group. Assuming that each communication resource has a base site point value of one, the current base site credit value for group A is two since communication units 106 and 108 of group A are each currently using one communication resource at base site 103.

When the current base site credit value plus the point value associated with an available communication resource is less than or equal to the maximum base site credit value, as in this example since $3 \leq (2+1)$, the base site 103 determines whether it has received a queue instruction from the system controller 101. At this point in the allocation process from the base site's perspective, the base site 103 can allocate another communication resource to group A provided that group A has not reached its maximum system credit value. The current system credit value for group A is determined and compared to the maximum system credit value for group A by the system controller 101.

Upon receiving the forwarded call request from the base site 103, the system controller 101 determines whether a current system credit value for group A plus a point value associated with a communication resource that is available at base site 103 to support the particular call request is less than or equal to the maximum system credit value. As mentioned above, the maximum system credit value for group A is three and, assuming that each communication resource has a system point value of one, the current system credit value for group A is three since communication units 106 and 108 of group A are each using one communication resource at base site 103 and communication unit 109 of group A is utilizing one communication resource 126 at base site 104. In this example, the current system credit value of group A plus the point value of an available communication resource at base site 103 is greater than the maximum system credit value of group A because the current system credit value (i.e., three) is already equal to the maximum system credit value (i.e., three). Therefore, in this case, the system controller 101 transmits a queue instruction to the base site 103 instructing the base site 103 to queue the call request. By queuing the call request and not permitting group A to utilize another communication resource at this time, the present invention, attempts to maintain a desired balance among the groups of communication units with respect to the usage of communication resources. In the preferred embodiment, the present invention is utilized during busy hours only, when the probability is high that many groups will want to use communication resources simultaneously. During non-busy hours, unrestricted use of communication resources by groups may be preferable.

The queued call request is processed (i.e., allocated a resource) some time after the current system credit value for group A becomes less than the maximum system credit value for group A. The length of time the queued call remains queued depends upon the number of queued calls. In a preferred embodiment, the queued calls are processed on a first-in, first-out basis, although other known queuing schemes may be used. Thus, a queued request of one or more other communication units in group A might be processed before the queued request of communication unit 107. When the queued request of communication unit 107 becomes the next request to be processed and the current system credit value of group A is less than the maximum system credit value of group A by at least the point value associated with an available communication resource at base site 103, the system controller 101 instructs base site 103 to process the queued call request.

The current system credit value becomes less than the maximum system credit value when a sufficient number of currently allocated resources are de-allocated. When a communication unit (e.g., 106) terminates its call, the base site 103 and system controller 101 de-allocate the unit's communication resource 124 and decrease their respective current credit values by an amount equal to the respective point values of the de-allocated resource. Thus, when a sufficient number of communication resources allocated to a particular group of communication units have been de-allocated, the current system or base site credit value for the group becomes less than the maximum system or base site credit value for the group. In an analogous manner, when a communication resource is allocated to a communication unit, the current system and base site credit values for the communication unit's group are increased by an amount equal to the respective point values associated with the allocated resource.

As a further example of the present invention, consider the communications of group B. Upon determining a need to communicate, communication unit 112 of group B transmits a call request to base site 104. Upon receiving the call request, the base site 104 forwards the call request to the system controller 101 and determines whether or not any communication resources are available to support the requested call. When a communication resource is available, the base site 104 obtains the maximum base site credit value for group B, either by examining the base site's own memory or requesting the maximum credit value from the system controller 101, and determines whether a current base site credit value for group B plus a point value associated with a communication resource that is available to support the particular call request is less than or equal to the maximum base site credit value for group B.

As mentioned above, the maximum base site credit value for group B is two and, assuming that each communication resource has a base site point value of one, the current base site credit value for group B is two since communication units 111 and 113 of group B are each using one communication resource at base site 104. Thus, in this case, the current base site credit value is equal to the maximum base site credit value and, therefore, the current base site credit value plus the point value associated with an available communication resource is greater than the maximum base site credit value (i.e., 2+1>2). Since the current base site credit value plus the point value associated with an available communication resource is greater than the maximum base site credit value, the base site 104 queues the call request and awaits de-allocation of at least one resource currently allocated to group B. Once a communication resource allocated to group B is de-allocated, the base site 104 determines whether it has received a queue instruction from the system controller 101 and the allocation procedure continues as described above with regard to group A.

Although the above discussion described allocation routines in accordance with the present invention being performed by the system controller 101 and the base sites 103-104 simultaneously, one of ordinary skill will appreciate that the system controller 101 or the base sites 103-104 may perform allocation of their respective communication resources independent of each other. That is, the system controller 101 might allocate communication resources in accordance with the present invention, while the base sites 103-104 do not. Alternatively, each base site 103-104 might allocate communication resources in accordance with the present invention, while the system controller 103-104 does not.

As described above, the present invention restricts the monopolization of communication resources by setting an upper limit on the number of resources that any one group of communication units may use at any one time. Thus, the present invention attempts to insure that each group of communication units that is paying for service on a trunked communication system will have access to at least one communication resource, particularly during peak communication traffic periods. The minimum number of communication resources that each group of communication units will be assured access to is dynamically settable by system operators via the group maximum credit values and the points associated with the communication resources.

FIG. 2 illustrates a logic flow diagram 200 of steps executed by a system controller to allocate communication resources in accordance with a preferred embodiment of the present invention. The logic flow begins (201) when the system controller associates (203) a point value with each communication resource at each base site and a maximum system credit value with each group of communication units. In the preferred embodiment, the associations of block 203 are performed once upon system configuration and remain fixed. In an alternative embodiment, the associations may be performed from time-to-time and, therefore, be dynamic.

At some particular time, the system controller receives (205) a call request from a requesting communication unit via a base site. The call request identifies the communication unit and the communication unit's group. The system controller determines (207) whether the base site serving the requesting communication unit has any communication resources available that can support the requested call. When no such resources are available, the system controller queues (209) the call request. However, when at least one such resource is available, the system controller determines (211) whether the current system credit value of the requesting units group is less than the maximum system credit value of the requesting unit's group. When the current system credit value is greater than or equal to the maximum system credit value, the system controller queues (209) the call request. However, when the current system credit value is less than the maximum system credit value, the system controller determines (213) whether the current system credit value plus a point value of an available communication resource is less than or equal to the maximum system credit value.

When the current system credit value plus a point value of an available communication resource is greater than the maximum system credit value, the system controller queues (209) the call request. However, when the current system credit value plus a point value of an available communication resource is less than or equal to the maximum system credit value, the system controller allocates (215) the available communication resource to the requesting unit and increases (217) the current credit value of the requesting unit's group by the point value associated with the allocated communication resource. It should be noted that the allocation of the available resource by the system controller is preferably a logical allocation. That is, the system controller associates the requesting unit and the requesting unit's group with the allocated resource in a lookup table stored at the system controller, and instructs the serving base site to allow the requesting unit to communicate over the allocated resource. It should further be noted that, although the evaluation of the current system credit value with respect to the maximum system credit value was performed herein using two decision blocks 211, 213, one of ordinary skill will appreciate and understand that such evaluation may be performed with only one such decision block (e.g., block 213).

Once the requesting unit has been allocated a resource, the system controller continuously determines (219) whether the requesting unit's communication has terminated. When the communication has terminated, the system controller de-allocates (221) the communication resource from the requesting communication unit and decreases (223) the current system credit value of the requesting unit's group by the point value of the de-allocated resource, thereby ending (225) the logic flow.

While the call request is queued, the system controller continuously determines whether a communication resource is available or whether the current system credit value plus the available resource point value is less than or equal to the maximum system credit value. When either condition is satisfied (i.e., when a resource is available or the current system credit value plus the available resource point value is less than or equal to the maximum system credit value), the system controller dequeues either the requesting unit's call request or another call request, if there are multiple call requests in the queue. Once the requesting unit's call request is dequeued, the logic flow proceeds at decision block 207.

FIG. 3 illustrates a logic flow diagram 300 of steps executed by a base site to allocate communication resources in accordance with an alternative embodiment of the present invention. The logic flow begins (301) when the base site receives (303) a call request from a requesting communication unit. The call request identifies the communication unit and the communication unit's group. The base site then determines (305) whether it has any communication resources available that can support the requested call. When no such resources are available, the base site queues (307) the call request. However, when at least one such resource is available, the base site queries (309) the system controller to obtain the maximum base site credit value of the requesting unit's group. Upon receiving the maximum base site credit value from the system controller, the base site determines (311) the current credit value of the requesting unit's group. This determination may be accomplished by looking up the current credit value from a volatile memory at the base site.

Upon obtaining the maximum base site credit value and the current base site credit value, the base site determines (313) whether the current base site credit value plus a point value of an available resource is less than or equal to the maximum base site credit value. When the current base site credit value plus a point value of an available communication resource is greater than the maximum base site credit value, the base site queues (307) the call request. However, when the current base site credit value plus a point value of an available communication resource is less than or equal to the maximum base site credit value, the base site determines (315) whether the system controller issued a queue instruction. As discussed above, the system controller issues a queue instruction when the requesting unit's group has either reached its maximum system credit value or will exceed its maximum system credit value with allocation of an available resource.

When a queue instruction has been issued, the base site queues (307) the call request. However, when no queue instruction has been issued, the base site allocates (317) the available communication resource to the requesting unit and increases (319) the current credit value of the requesting unit's group by the point value associated with the allocated communication resource. Once the requesting unit has been allocated a resource, the base site continuously determines (321) whether the requesting unit's communication has terminated. When the communication has terminated, the base site de-allocates (323) the communication resource from the requesting communication unit and decreases (325) the current base site credit value of the requesting unit's group by the point value of the deallocated resource, thereby ending (327) the logic flow.

While the call request is queued, the base site continuously determines whether a communication resource is available or whether the current base site credit value plus the available resource point value is less than or equal to the maximum base site credit value. When either condition is satisfied (i.e., when a resource is available or the current base site credit value plus the available resource point value is less than or equal to the maximum base site credit value), the base site dequeues either the requesting unit's call request or another call request, if there are multiple call requests in the queue. In addition, when a call request is queued responsive to the system controller's issuance of a queue instruction (315), the base site preferably dequeues the call request upon receipt of a dequeue instruction from the system controller. Once the requesting unit's call request is dequeued, the logic flow proceeds at decision block 305.

The present invention provides a method for allocating communication resources among groups of communication units. With this invention, all groups of communication units in a communication system are guaranteed access to some minimum number of communication resources by limiting the maximum number of resource points any one group may utilize at any one time. In this manner, the present invention prohibits large groups from monopolizing system resources to the detriment of smaller groups, especially during peak communication traffic periods.

While the present invention has been particularly shown and described with reference to particular embodiments thereof, it will be understood by those skilled in the art that various changes in form and details may be made therein without departing from the spirit and scope of the present invention.

We claim:

1. A method for a resource allocation device to allocate communication resources among groups of communication units, the method comprising the steps of:

receiving a call request from a communication unit of a first group of communication units;

determining whether a current credit value of the first group is less than a maximum credit value of the first group, the current credit value of the first group being equal to a summation of point values associated with communication resources currently being utilized by communication units of the first group and the maximum credit value of the first group being based on a cumulative point value associated with a predetermined quantity of communication resources that the first group is permitted to utilize for communications; and when the current credit value of the first group is less than the maximum credit value of the first group, allocating an available communication resource to the communication unit to produce an allocated communication resource.

2. The method of claim 1, wherein the step of allocating an available communication resource when the current credit value of the first group is less than the maximum credit value of the first group comprises the step of allocating an available communication resource to the communication unit when a point value of the available communication resource plus the current credit value of the first group is less than or equal to the maximum credit value of the first group.

3. The method of claim 1, further comprising the step of increasing the current credit value of the first group by an amount equal to a point value of the allocated communication resource upon allocation of the allocated communication resource.

4. The method of claim 1, further comprising the steps of:
de-allocating the allocated communication resource; and
decreasing the current credit value of the first group by an amount equal to a point value of the allocated communication resource upon de-allocation of the allocated communication resource.

5. The method of claim 1, further comprising the step of queuing the call request to produce a queued call request when the current credit value of the first group is greater than or equal to the maximum credit value of the first group.

6. The method of claim 5, further comprising the step of processing the queued call request when the current credit value of the first group becomes less than the maximum credit value of the first group.

7. The method of claim 1, further comprising the step of processing a queued call request of a second communication unit of the first group when the current credit value of the first group becomes less than the maximum credit value of the first group.

8. A method for a system controller to allocate communication resources among groups of communication units, the method comprising the steps of:
associating a respective point value with each of the communication resources;
associating a maximum credit value with each group of communication units, the maximum credit value of each group being based on a cumulative point value associated with a predetermined quantity of communication resources that each group is permitted to utilize for communications;
receiving a call request from a communication unit of a first group of communication units;
determining, responsive to the call request, whether a current credit value of the first group plus a point value of an available communication resource is less than or equal to the maximum credit value of the first group, the current credit value of the first group being equal to a summation of point values associated with communication resources currently being utilized by communication units of the first group; and
when the current credit value of the first group plus a point value of an available communication resource is less than or equal to the maximum credit value of the first group, allocating the available communication resource to the communication unit to produce an allocated communication resource.

9. The method of claim 8, further comprising the step of queuing the call request to produce a queued call request when the current credit value of the first group is greater than or equal to the maximum credit value of the first group.

10. The method of claim 9, further comprising the step of processing the queued call request when the current credit value of the first group becomes less than the maximum credit value of the first group.

11. The method of claim 8, further comprising the step of increasing the current credit value of the first group by an amount equal to a point value of the allocated communication resource upon allocation of the allocated communication resource.

12. The method of claim 8, further comprising the steps of:
de-allocating the allocated communication resource; and
decreasing the current credit value of the first group by an amount equal to a point value of the allocated communication resource upon de-allocation of the allocated communication resource.

13. In a radio communication system that includes a system controller, at least one base site, and a plurality of communication units, the plurality of communication units being arranged into a plurality of groups, a method for a base site of the at least one base site to allocate communication resources among the plurality of groups, the method comprising the steps of:
receiving a call request from a communication unit of a first group of the plurality of groups;
receiving a maximum credit value for the first group from the system controller, wherein each of the communication resources has a respective point value associated therewith and wherein each group of the plurality of groups has a maximum credit value associated therewith, the maximum credit value being based on a cumulative point value associated with a predetermined quantity of communication resources that each group is permitted to utilize for communications;
determining a current credit value for the first group, the current credit value of the first group being equal to a summation of point values associated with communication resources currently being utilized by communication units of the first group; and
allocating an available communication resource to the communication unit based on the maximum credit value of the first group and the current credit value of the first group.

14. The method of claim 13, wherein the step of allocating comprises the steps of:
determining whether the current credit value of the first group plus a point value of an available communication resource is less than or equal to the maximum credit value of the first group; and
when the current credit value of the first group plus a point value of an available communication resource is less than or equal to the maximum credit value of the first group, allocating the available communication resource to the communication unit to produce an allocated communication resource.

15. The method of claim 14, further comprising the step of increasing the current credit value of the first group by an amount equal to a point value of the allocated communication resource upon allocation of the allocated communication resource.

16. The method of claim 14, further comprising the steps of:
de-allocating the allocated communication resource; and
decreasing the current credit value of the first group by an amount equal to a point value of the allocated communication resource upon de-allocation of the allocated communication resource.

17. The method of claim 14, further comprising the step of queuing the call request to produce a queued call request when the current credit value of the first group plus a point value of an available communication resource is greater than the maximum credit value of the first group.

18. The method of claim 17, further comprising the steps of:

processing the queued call request when the current credit value of the first group plus a point value of an available communication resource becomes less than or equal to the maximum credit value of the first group.

19. The method of claim 14, further comprising the step of processing a queued call request of a second communication unit of the first group when the current credit value of the first group plus a point value of an available communication resource becomes less than or equal to the maximum credit value of the first group.

\* \* \* \* \*